United States Patent [19]

Unfried

[11] 4,053,121
[45] Oct. 11, 1977

[54] TAPE GUIDING AND TENSION CONTROLLING CASSETTE ASSEMBLY

[75] Inventor: Happy H. Unfried, Long Beach, Calif.

[73] Assignee: Audio Magnetics Corporation, Irvine, Calif.

[21] Appl. No.: 698,282

[22] Filed: June 21, 1976

[51] Int. Cl.² .................................................. G11B 23/10
[52] U.S. Cl. .................................................. 242/199; 242/76
[58] Field of Search ............. 242/199, 200, 198, 197, 242/71.2, 71.1, 76; 360/96, 93

[56] References Cited

U.S. PATENT DOCUMENTS

| | | | |
|---|---|---|---|
| 3,092,346 | 6/1963 | Goodell et al. | 242/76 |
| 3,495,787 | 2/1970 | Wallace | 242/199 |
| 3,620,480 | 11/1971 | Knox | 242/199 |
| 3,841,582 | 10/1974 | Schaeffer et al. | 242/199 |

*Primary Examiner*—George F. Mautz
*Attorney, Agent, or Firm*—William W. Haefliger

[57] ABSTRACT

A tape cassette assembly has base and cover elements forming a case, there being a first rotatable tape reel mounted within the case, the reel having an axis of rotation, the tape adapted to pass by an edge of the case and to wind on a pack on said reel, said edge registrable with a play back head. Also included are:

a. a first tape follower bodily movable within the case to guide the tape approaching the pack on said reel, and b. first guide means carried by the case to guide bodily movement of the follower along the guide means in arcuate directions toward and away from that portion of the reel which is at the side of said axis remote from said edge of the case.

15 Claims, 12 Drawing Figures

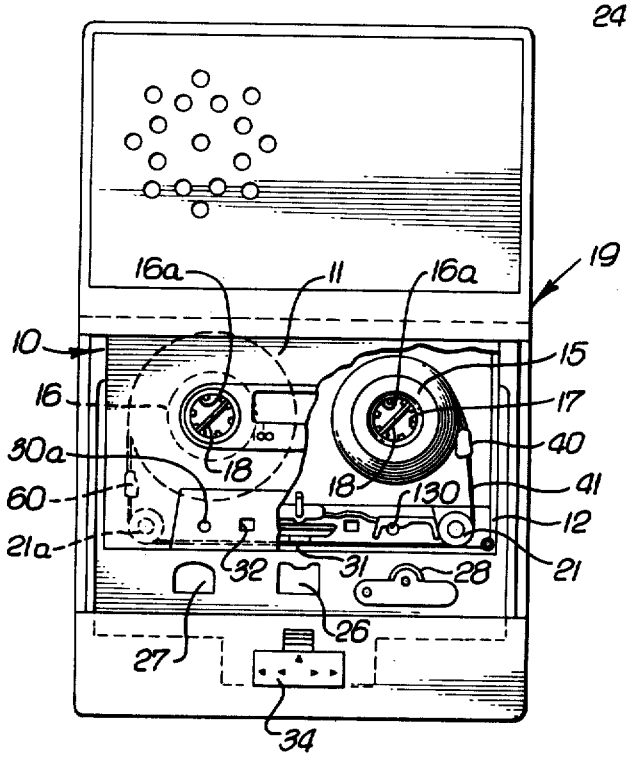
FIG. 1.
FIG. 2.
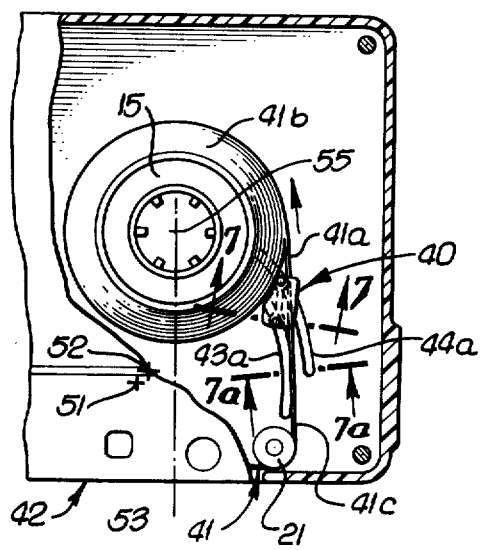
FIG. 3.
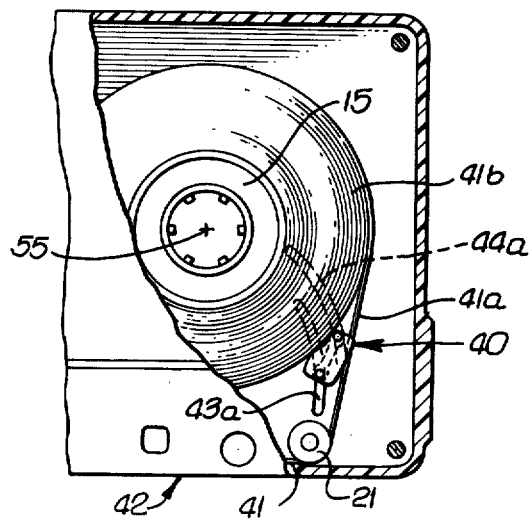
FIG. 4.

TAPE GUIDING AND TENSION CONTROLLING CASSETTE ASSEMBLY

BACKGROUND OF THE INVENTION

This invention relates generally to magnetic tape cassettes, and more particularly concerns improvements in tape positioning and tension control.

A number of problems exist in current cassette design. Among these are tape tension discontinuities which can arise during fast winding operation, and leading to tape pack slip, steps in winds and damage to the cassette during long term storage.

In addition, there are operating conditions under which a section of damaged tape can cause additional tape damage ultimately resulting in destruction of cassette operability. As an example, assume that a few layers of tape protrude above the otherwise level wound tape pancake. If this protruding tape section becomes damaged due to contact with the parallel housing walls, the damaged section will thereafter produce a rough wind acting to broaden the overall thickness (i.e. width) of the pancake. Once the opposite sides of the pancake respectively and simultaneously rub against the upper and lower interior walls of the cassette case, drag increases significantly and larger tensions are developed in the tape, enhancing the possibility of additional tape damage. The same problems can and do exist when thin, low friction liners are employed within the cassette case.

A further problem arises from insufficient tape tension. For example, consider the situation where, for a short period of time, the tape tension upstream and downstream of the "nip" between the capstan and pressure roller is zero. Since the axial alignment of the capstan and pressure roller cannot be perfectly parallel, the tape will tend to move upward, or downward along the face of the pressure roller during its lengthwise travel, and a number of opportunities then exist for subsequent tape damage. An additional problem is that of tape oscillation at the drive "nip", i.e. wandering of the tape on either side of center. Such oscillation can also lead to tape damage, i.e. such as buckling, ironing and wrinkling or creasing of the tape.

Summarizing, cassette failure is predominantly due to damage to, or improper guidance of, the tape within the case, in the course of the various modes of cassette operation. Known tape guidance devices, as for example those disclosed in U.S. Pat. Nos. 3,841,582 and 3,042,346, do not provide the unusual features of construction, mode of operation and results as are now afforded by the present invention.

SUMMARY OF THE INVENTION

It is a major object of the invention to provide for tape guidance and control in such manner as to minimize the possibilities of tape damage due to destructive contact with case, liner or other surfaces. Basically, the invention is embodied in the combination that comprises a tape follower bodily movable within the case to guide the tape approaching the tape pack on a reel; and guide means carried by the case to guide bodily movement of the follower in an arcuate direction toward and away from that portion of the reel which is at the side of the reel axis remote from the edge of the case registrable with a play-back head. Such guide means may advantageously include a pair of tracks or guideways on each of the case base and cover elements, the tracks of each pair interfitting the follower at two guide locations. Further, a second and similar follower and guide means may be provided to guide tape approaching a tape pack on a second reel within the cassette case, as will be seen.

Additional objects include the provision of tracks which are concave toward the region within the case between the reel and case edge, such tracks preferably defining circular segments having different radii and spaced apart centers in that region; the alternative provision of tracks which are convex toward that region of the case between the reel and case edge; the provision of a tape turn director which may be rotary or non-rotary; the provision of a very low friction surface on a non-rotary tape director; and the provision of a follower member having pins received in track grooves in such manner as to bodily rotate the follower in response to its movement along the grooves.

Among the unusual advantages afforded by the invention are the elimination of need for placement of low friction liners adjacent tape packs in cassettes, the accurate guidance of the tape by followers which are bodily movable and guided by arcuate tracks, directed as described; and the reduction of large differences in winding tension as between the (slow) PLAY and (fast) WIND modes of operation, and the corresponding reduction or elimination of damage to the tape which can arise where such large differences in winding tension are not reduced. The latter are achieved by the orientation of the follower guide tracks, as will be seen.

These and other objects and advantages of the invention, as well as the details of an illustrative embodiment, will be more fully understood from the following description and drawings, in which:

DRAWING DESCRIPTION

FIG. 1 is a plan view showing the relationship of a cassette to play-back equipment;

FIG. 2 is a perspective view of the FIG. 1 cassette;

FIGS. 3 and 4 are fragmentary plan views of the interior of a cassette incorporating the invention;

DETAILED DESCRIPTION

Figure 4A:
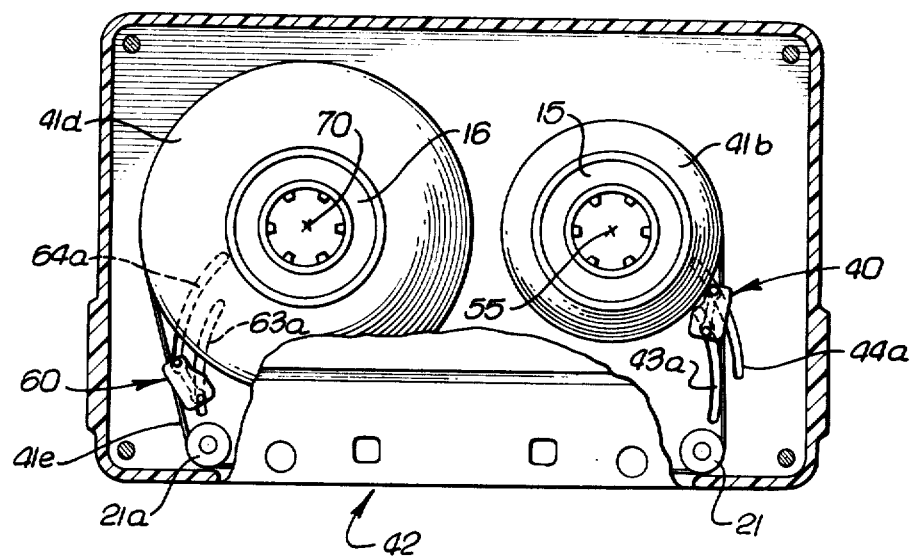
FIG. 4a is a plan view of a cassette interior incorporating the invention.

Referring first to FIGS. 1 and 2, the tape cassette assembly is shown to include a hollow case 10 having upper and lower case sections 11 and 12 which are suitably attached together as by the fasteners 13 and 14. Sonic welding may alternatively be used. Sections 11 and 12 may respectively comprise cover and base elements. Mounted in the case are a pair of winding reels 15 and 16, suitable annular flanges in the case sections supporting the reels for rotation. The reels are themselves annular to form central openings 16a into which the lugs 17 on the reels project inwardly toward the axes of rotation, as shown. These lugs interfit driving elements shown at 18 in FIG. 1, and which are part of the playback unit 19. Accordingly, during playback the tape 41 is typically wound on the reel 15, as shown, in response to rotation of the right driving element 18.

Also contained within the case are two idler rolls 21 about which the tape travels during advancement thereof. In this regard, the case has an elongated opening along one edge thereof to expose tape traveling lengthwise along said edge. FIG. 2 shows the elongated opening in the form of sections 23, 24 and 25 through which the tape is exposed to the exterior during tape travel between the rollers 21. In this regard, when the cassette is mounted on the playback equipment 19, the tape is exposed to a magnetic read/write head 26 opposite opening 25, an erase head 27 opposite an opening 23 and an idler roller 28 opposite the other opening 23. In this regard, the heads 26 and 27 and the roller 28 are relatively movable into engagement with the tape proximate the openings 23 and 25 in order to enable operation of the equipment. Similarly, these elements are movable relatively away from the tape to facilitate mounting and demounting of the cassette in the playback equipment. Aligned openings 30 in the case are adapted to receive a rotary capstan 130 immediately behind the tape for driving the latter when the idler roller 28 urges the tape into contact with the capstan. A similar pair of aligned openings appear at 30a for the same use when the cassette is turned over for driving the tape in the opposite direction.

A spring urged support 31 is located inwardly of the tape and opposite the magnetic head 26, the support being carried by the cassette and typically consisting of a piece of soft felt. The support serves as a back-up for the tape when the magnetic head is brought into contact with the opposite side of the tape. Finally, two pairs of aligned openings 32 and 33 are formed in the case to receive posts for locating and locking the cassette in place upon the playback equipment 19. A manual control is shown at 34 and is operable to effect displacement of the heads 26 and 27 and roller 28 relatively into engagement with the tape and to initiate and stop advancement of the tape as described.

Coming now to the improvements with which the invention is more specifically concerned, a first tape follower is bodily movable within the case to guide the tape approaching a tape pack on a reel; and first guide means is carried by the case to guide such follower bodily movement in an arcuate direction toward and away from that portion of the reel which is at the side of the reel axis of rotation remote from the edge of the case adjacent openings 23–25.

In the example shown in FIGS. 3 and 4, the tape is shown at 41 and a first follower, as at 40, is bodily movable within the case 10 to guide the tape extent 41a approaching the first reel tape pack 41b on first reel 15. In this regard, a tape director, as for example roller 21, is carried by the case for turning the tape from a direction of travel along the case edge 42 to a direction of travel at 41c toward the follower 40, in each of its various positions. As to the latter, the follower position adjacent a small pack appears in FIG. 3, whereas, the follower position adjacent a large, built-up pack appears in FIG. 4, the frictional force developed by tape sliding engagement with the follower acting to urge the follower lightly against the pack during winding of tape thereon. The very light weight of the follower, which may consist of molded plastic material, and the directional constraints imposed on follower bodily movement, act to reduce the tension within the tape 41a. This result is also furthered by bodily rotation of the follower as it shifts position lengthwise of the guide means.

The first guide means to guide bodily movement of the follower typically comprises a pair of tracks on one of the cover and base elements, and preferably includes another pair of guide tracks on the other of such elements, the tracks of each pair interfitting the follower at two guide locations. In the example of FIGS. 3–7, tracks in the form of the pair of grooves 43 and 44 are formed in the cover element 11, and tracks in the form of the pair of grooves 43a and 44a are formed in the base element 12. Further, the follower may include upper pins 45 and 46 respectively interfitting the tracks or grooves 43 and 44, and lower pins 45a and 46a respectively interfitting tracks or grooves 43a and 44a.

Figure 5:
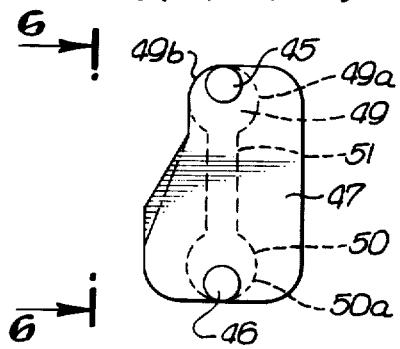
FIG. 5 is an enlarged plan view of a tape follower.
Figure 6:
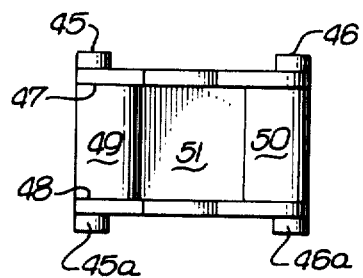
FIG. 6 is a view on lines 6—6 of FIG. 5.

As is clear from FIGS. 5 and 6, the follower includes upper and lower tape edge guide flanges 47 and 48, and enlarged, generally cylindrical tape surface guides 49 and 50 extending between the flanges, the latter overhanging the guides 49 and 50 as seen in FIG. 5. The two flanges are alike, and of greater width over guide surface 50 than over guide surface 49 in lateral directions normal to the longitudinal direction between the guides 49 and 50. A web 51 may be provided to interconnect the two guides. Pins 45 and 45a register eccentrically with guide 49, and pins 46 and 46a register eccentrically with guide 50, whereby the disposition of the tape engaging surfaces of the guides (as at 49a and 50a) toward the tape extents 41a and 41c is controlled by the relationship of the guideways 43a and 44a to the reel and tape pack and the position of the follower along those guideways. Note that edge 49b of the guide 49 is slidable engageable with the tape pack, without flange overlap of the pack.

Figure 7:
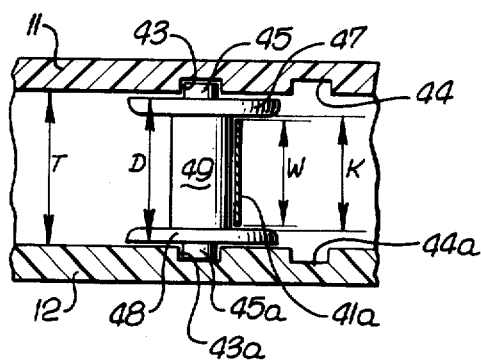
FIG. 7 is an enlarged section on lines 7—7 of FIG. 3 showing the follower slidably guided in cassette cover and base tracks.
Figure 7A:
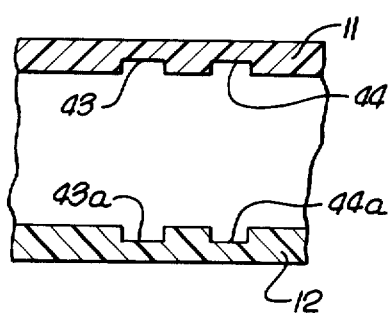
FIG. 7a is an enlarged section on lines 7a—7a of FIG. 3.

The overall dimension D between the outersides of the flanges 47 and 48, is slightly less than the dimension T between the inner surfaces of the case top and bottom walls, as seen in FIG. 7, so that the free sliding of the follower along the tracks 43a and 44a is assured; further, the dimension K between the inner surfaces of the flanges 47 and 48 slightly exceeds the tape edge-to-edge or width dimension W, as seen in FIG. 7, so that the tape is freely slidable between the flanges, and is guided to build-up in a smooth surfaced pack or pancake.

The pins 45 and 46 closely but slidably interfit upper grooves 43 and 44, respectively, and the pins 45a and 46a closely but slidably interfit lower grooves 43a and 44a, respectively. Note that projection of the arcuate grooves 43a and 44a will extend toward and intersect that portion of the reel 15 that lies at the side of reel axis 55 which is remote from the edge 42 of the case; also, the tracks or grooves are both concave toward the region within the case between the reel 15 and edge 42; and the tracks or grooves preferably define circular segments which have different radii, with spaced apart centers. As an example, the centers 51 and 52 for the respective track segments 43a and 44a lie at the side of a line or plane 53 which is opposite from the track segments, line or plane 53 passing through axis 55 and extending normal to edge 42. These features contribute to the unusually advantageous mode of operation and results achieved by the follower, and which include optimum or near optimum tape guidance.

Comparing FIGS. 3 and 4, it will be seen that the grooves or tracks cause the follower to turn clockwise and recede toward the roller 21 as the tape pack builds up, the result being that frictional drag of the tape against the guides 49 and 50 is minimized.

Extending the description to FIG. 4a, a second tape follower 60, like follower 40, is bodily movable within the case to guide tape approaching the pack 41d on the second reel 16 and in the same manner that follower 40 guides tape approaching the pack 41b. For this purpose, second guide means (such as upper tracks 63 and 64, not shown, and lower tracks 63a and 64a), may be provided in the case upper and lower walls to guide bodily movement of the second follower in an arcuate direction toward and away from that portion of the reel 16 that lies at the side of reel axis 70 remote from edge 42 of the case. Accordingly, the construction of the tracks 63, 64, 63a and 64a corresponds and is like that of tracks 43, 44, 43a and 44a, and the construction of follower 60 corresponds and is like that of follower 40.

When tape is being wound on pack 41b and unwound from pack 41d, follower 60 retreats away from pack 41d, under the influence of tape extent 41e traveling toward roller 21a, as in FIG. 4a; likewise, when tape is being wound on pack 41d and unwound from pack 41b, the follower 40 retreats toward roller 21.

Figure 9:
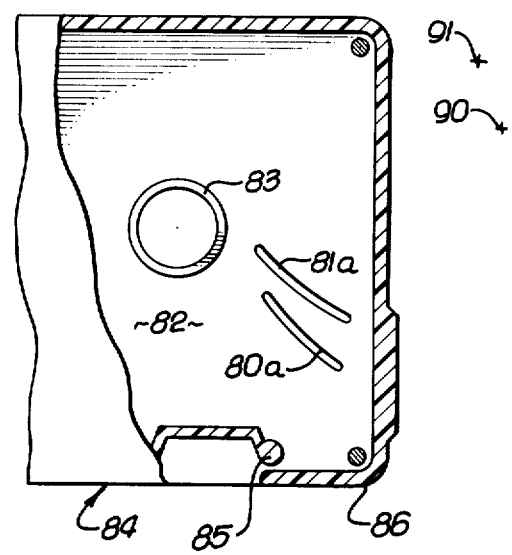

In FIG. 9, the two follower upper guideways or tracks 80 and 81 (not shown) as well as the two lower guideways 80a and 81a are convex toward the region 82 within the case between the reel 83 and case edge 84 (the latter being presentable toward the read/write head as described. The centers for the approximately circular segments defined by the tracks 80 and 81 are shown at 90 and 91, outside the case. Also, the tape director 85 which turns the tape near a corner 86 of the case is non-rotary. It may be characterized as having a low Kinetic coefficient of friction $\mu$, and for best results $\mu$ is less than about 0.25. An add-on low $\mu$ material may be employed. Usable materials for this purpose include molded plastic such as polystyrene, ABS and acetol, chrome plate, and SKOTCH-LITE reflective tape, a product of 3M Company.

Figure 10:
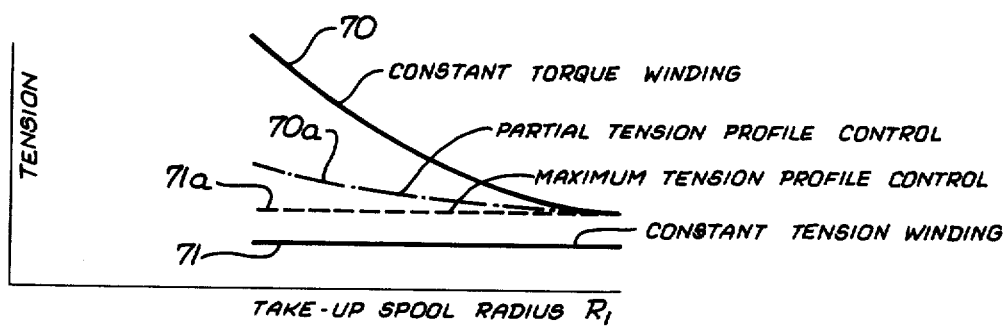
FIG. 10 is a graph.

Referring to FIG. 10, the upper solid line curve 70 illustrates take-up tension (high) produced in the tape during constant torque winding (PLAY) mode, as a function of take-up spool (PACK) radius, for a conventional cassette; lower solid line 71 illustrates take-up tension (low) produced in the tape during constant tension winding (FAST WIND) mode, as a function of take-up spool radius, for a conventional cassette; broken line 70a correponds to line 70 to illustrate lowered tape tension for PLAY mode in a cassette of the present invention; and broken line 71a corresponds to line 71 and illustrates increased tape tension for FAST WIND mode in a cassette of the present invention. It is clear that the differences between values of tape tension represented by the curves 70a and 71a are substantially less than the differences between values of tape tension represented by the curves 70 and 71.

Figure 8:
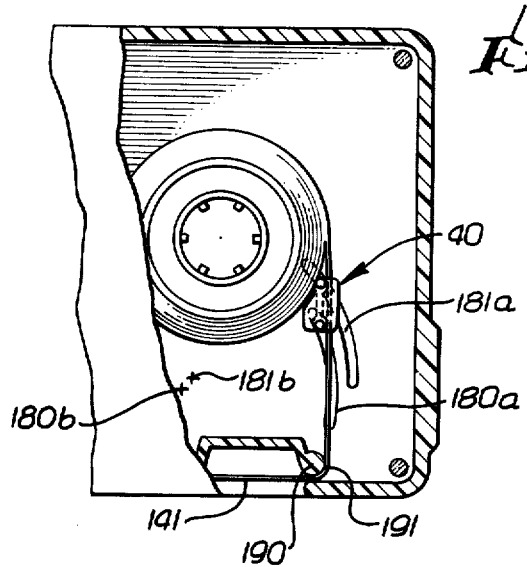
FIGS. 8 and 9 are fragmentary plan views of modified cassette interiors, incorporating the invention.

FIG. 8 shows the slots 180a and 181a similar to slots in FIG. 3; on the other hand, the director 190 is fixed and presents a curved surface 191 to turn the tape 141 toward the follower 40. Centers for the semicircular slots appear at 180b and 181b.

I claim:

1. In a tape cassette assembly having base and cover elements forming a case, there being a first rotatable tape reel mounted within the case, the reel having an axis of rotation, the tape adapted to pass by a front edge of the case and to wind on a pack on said reel, said front edge registrable with a play back head, the improvement comprising a. a first tape follower bodily movable within the case to guide the tape approaching the pack on said reel,
   b. there being first guide means carried by the case and directed toward that portion of the reel which is between said axis and the rear edge of the case remote from said front edge of the case, thereby to guide bodily movement of the follower along the guide means in arcuate directions toward and away from the reel, said first guide means including a pair of tracks on one of said elements and interfitting said follower at two guide locations.

2. The assembly of claim 1 wherein said first guide means includes a pair of tracks on the other of said elements, the tracks of each pair interfitting said follower at two guide locations.

3. The assembly of claim 1 including a second rotatable tape reel mounted within the case, the second reel also having an axis of rotation, the tape adapted to pass by said edge of the case and wind on a pack on the second reel as the tape unwinds off the pack on the first reel, and including c. a second tape follower bodily movable within the case to guide the tape approaching the pack on the second reel, and
   d. there being second guide means carried by the case to guide bodily movement of the second follower along the second guide means in arcuate directions toward and away from that portion of the second reel which is at the side of said axis remote from said front edge of the case.

4. The assembly of claim 3 wherein
   e. said first guide means includes a pair of tracks on the other of said elements, the tracks of each pair interfitting the first follower at two guide locations, and
   f. said second guide means includes a pair of tracks on each of said elements, the tracks of each said pair interfitting the second follower at two guide locations.

5. The assembly of claim 4 wherein said pairs of tracks are both concave toward the region within the case between said reel and said edge.

6. The assembly of claim 5 wherein each of said tracks of a pair defines a circular segment, said segment having different radii, and spaced apart centers in said region, whereby the follower is bodily rotated as it moves bodily along said tracks.

7. The assembly of claim 4 wherein said pairs of tracks are both convex toward the region within the case between said reel and said rear edge.

8. The assembly of claim 7 wherein each of said tracks of a pair defines a circular segment, said segments having different radii and spaced apart centers outside the case.

9. The assembly of claim 1 including a tape director carried by the case for turning the tape from a direction of travel along said front edge to a direction of travel toward said bodily movable first follower in each of its positions.

10. The assembly of claim 2 wherein the follower comprises upper and lower tape edge guide flanges, tape surface guides extending between the flanges and pins projecting from the flanges, the tracks defined by arcuate grooves in said elements and receiving said pins.

11. The assembly of claim 10 wherein the pins projecting from each flange are received into two separate grooves.

12. The assembly of claim 9 wherein said director comprises a rotary idler.

13. The assembly of claim 9 wherein said director is non-rotary.

14. The assembly of claim 13 wherein said director has a surface slidably engageable by the tape, said surface having a kinetic coefficient of friction less than about 0.30.

15. In a tape cassette assembly having a case and a first rotatable tape reel within the case, the reel having an axis of rotation and the tape adapted to form a pack on the reel, a. a first tape follower bodily movable within the case to guide the tape approaching the tape pack on the reel,
b. a non-rotatable tape director carried by the case to turn the tape and direct it toward the follower, and
c. guide means including a pair of arcuate guide tracks carried by the case to interfit the follower, and along which the follower is movable to bodily rotate in response to such movement,
d. the case having opposite side walls, and said pair of tracks located on one of said walls.

* * * * *